United States Patent

[11] 3,565,392

[72] Inventors Austin U. Bryant
 Walnut Creek;
 Jack E. Piccardo, Oakland, Calif.
[21] Appl. No. 819,730
[22] Filed Apr. 28, 1969
[45] Patented Feb. 23, 1971
[73] Assignee Grove Valve and Regulator Company
 Oakland, Calif.

[54] FLOW-BLOCKING DEVICE WITH RETRACTABLE SEALING MEANS
 8 Claims, 5 Drawing Figs.

[52] U.S. Cl. ................................................. 251/159,
 251/174, 251/315, 251/172
[51] Int. Cl. ............................................. F16k 25/00
[50] Field of Search ...................................... 251/159,
 158, 170, 171, 160, 172, 174, 187, 188, 189, 190,
 191, 315, 317

[56] References Cited
UNITED STATES PATENTS
2,370,751 3/1945 Pradger ........................ 251/159
2,796,230 6/1957 Grove ........................... 251/172
3,043,469 7/1962 Leach ........................... 251/172X
3,110,470 12/1963 Dumm .......................... 251/159
3,266,525 8/1966 Wolter .......................... 251/174
3,463,448 8/1969 Piccardo ....................... 251/159
FOREIGN PATENTS
481,099 5/1953 Italy ............................. 251/172

Primary Examiner—Clarence R. Gordon
Attorney—Melvin R. Stidham

ABSTRACT: Retractable sealing means for flow-blocking devices, including valves, comprising an anchor member secured to the body of the device around the seat ring assembly. Annular members on the anchor member and seat ring, respectively, are disposed in opposition to each other, and one forms an annular piston received in an annular fluid chamber formed in the other. A fluid duct extending through a housing wall opens into the chamber so that pressure fluid may be introduced to retract the seat ring from the flow-blocking device against which it seals.

INVENTOR.
AUSTIN U. BRYANT
JACK E. PICCARDO
BY Melvin R. Seidham
ATTORNEY

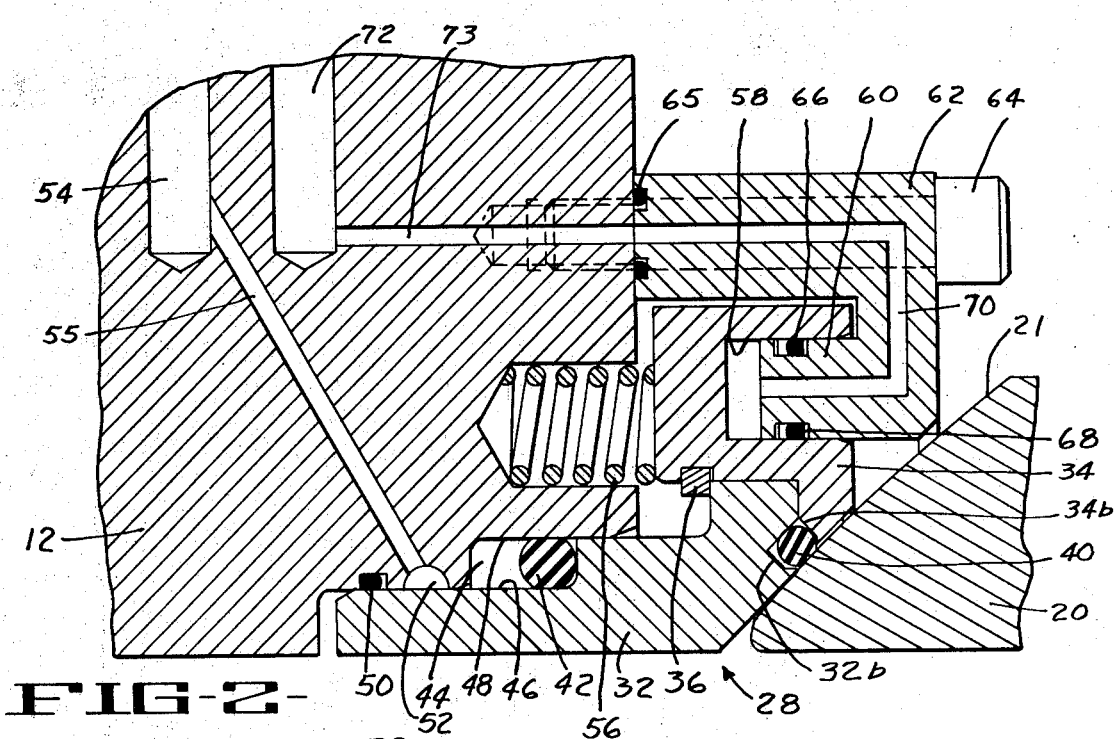
FIG-2-
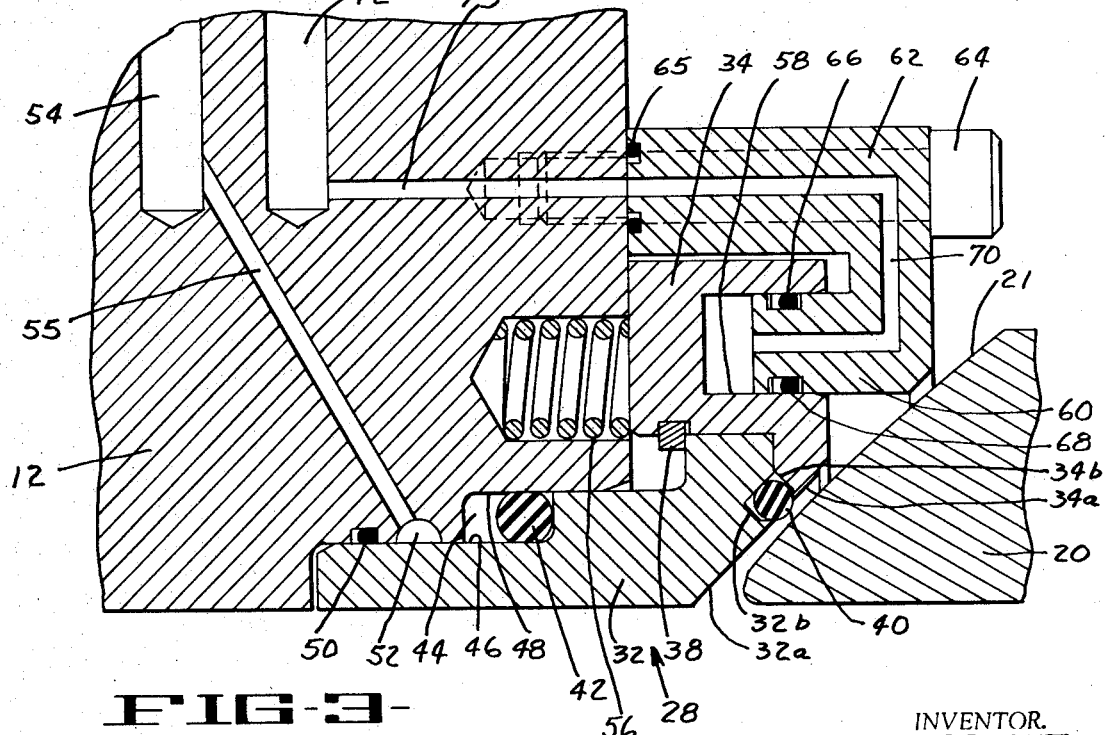
FIG-3-

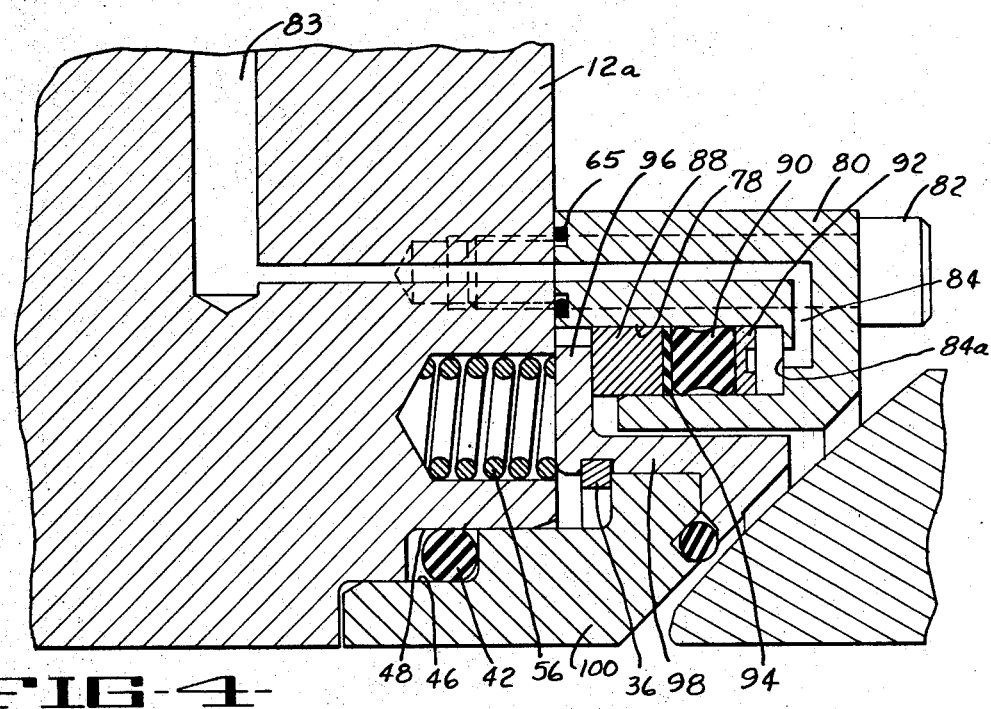
FIG-4-
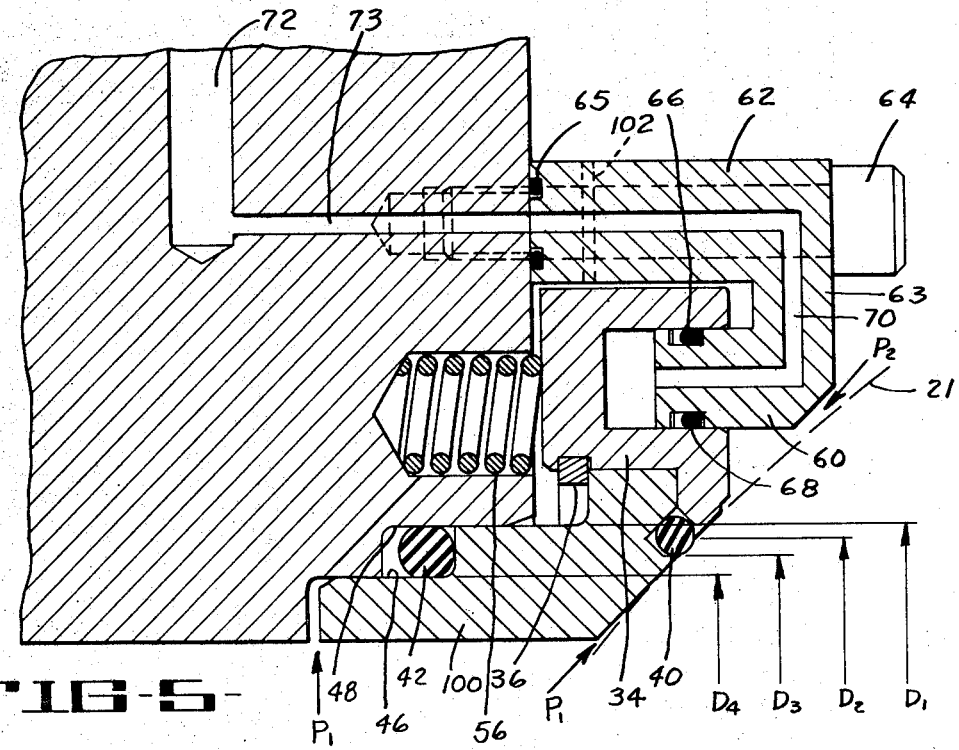
FIG-5-
INVENTOR.
AUSTIN U. BRYANT
JACK E. PICCARDO
BY Melvin R. Stidham
ATTORNEY 3,565,392

FLOW-BLOCKING DEVICE WITH RETRACTABLE SEALING MEANS

BACKGROUND OF THE INVENTION

This invention relates to a flow-blocking or control device with retractable sealing means and, more particularly, to a valve type of construction wherein a seat ring assembly may be retracted selectively into and out of sealing engagement with a flow blocking member to facilitate operation of the device and to minimize the possibility of wear and abrasive damage.

In many valves and related devices, a flow-blocking or control member is moved transversely across the seal means during operation of the device. Particularly under high pressures, the force of the fluid stream acting against the flow-blocking member drives the seal assembly and flow blocking member into such firm engagement that considerable work is required to operate the device. Moreover, any surface irregularities or foreign matter which might occur on the surface of the blocking member can grate, cut or otherwise damage finely finished surfaces or resilient seals on the seal assembly as the blocking member slides past it.

OBJECTS OF THE INVENTION

Accordingly, it is an object of this invention to provide sealing means for a flow-blocking device which may be selectively retracted from sealing engagement to facilitate operation.

It is a further object of this invention to provide a sealing device on the body of a valve and means selectively operated to retract the sealing device from engagement with the valve closure member.

It is a further object of this invention to provide a seat ring assembly carried on a valve body and hydraulically operated means for retracting the seat ring from sealing engagement.

It is a further object of this invention to adapt a seat ring assembly as one component of a hydraulic cylinder and piston assembly so that the seat ring can be retracted by hydraulic pressure.

SUMMARY OF THE INVENTION

In accordance with the preferred embodiments of this invention, I provide a stationary anchor ring secured to the body so as to be coaxial with and opposite the seat ring, and between it and the flow-blocking member against which the seat ring seals. In one preferred embodiment, a rearward extending annular piston on the anchor ring is received in a complementary groove around the seat ring. A fluid duct through the anchor ring annular piston open into the groove, and seal means render the slidably engaging concentric surfaces of the annular piston and the seat ring groove fluid tight. A pressure fluid may be introduced into the duct to force the seat ring away from the anchor ring and, hence, the valve closure member. In an alternative construction, a groove is provided in the anchor ring and an annular piston is slidable sealed therein to push against the seat ring when fluid is introduced. In either embodiment, another pressure chamber may be provided between the valve body and the seat ring to force the seat ring into sealing engagement against the valve closure member.

Other objects and advantages of this invention will become apparent from the description following when read in conjunction with the accompanying drawing.

BRIEF DESCRIPTION OF THE DRAWING

FIG. 2 and 3 are enlarged partial section view of one seat ring embodiment of this invention with the seat ring assembly in sealing and retracted positions, respectively;

FIG. 4 is an enlarged partial section view of a second embodiment of this invention; and FIG. 5 is an enlarged partial section view of a third embodiment of this invention.

DESCRIPTION OF THE PREFERRED EMBODIMENTS

THE EMBODIMENT OF FIGS. 1 TO 3

Figure 1:
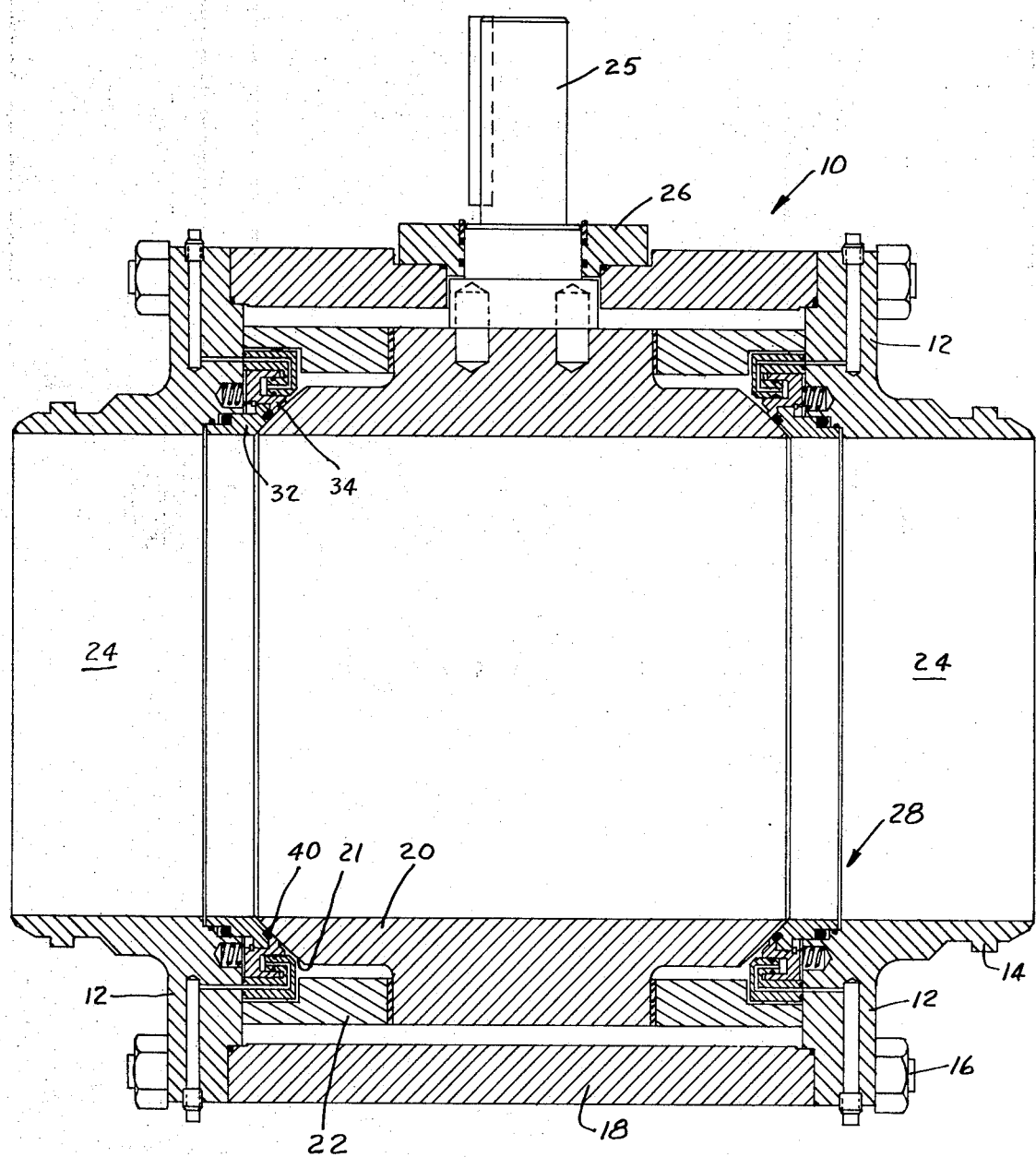
FIG. 1 is a vertical section section view of a ball valve embodying features of this invention.

Referring now more particularly to FIG. 1, there is illustrated a ball valve 10, the body of which comprises a pair of end walls 12 with integral hubs 14 bolted at 16 or otherwise secured to opposite sides of a body ring 18. The ball closure member 20 may be journaled in bearing blocks 22 which are clamped between the end walls 12. The closure member 20 may be rotated through 90° between the open position shown and its closed position wherein its imperforate spherical surface 21 closes off the flow passageways 24, by turning a stem 25 which extends through the bonnet seal 26. While a ball valve has been thus far described, it is to be understood that the seat ring assembly 28 forming the principal feature of this invention may be employed with equal efficacy in valves of other types, such as gate valves, and in other flow blocking or flow control devices.

Now referring to FIGS. 2 and 3, the seal ring assembly 28 of this invention may comprise inner and outer seat rings 32 and 34 which may be secured together by an suitable means, such as a snap ring 36 which is sprung into a recess 38 on the outer seat ring and thereby positioned behind the inner seat ring. The seat rings have complementary spherical or conical surfaces 32a, 34a and opposing angles surfaces 32b, 34b which, when the seat rings are assembled, form the sidewalls of a recess that accommodates a seal ring, such as the O-ring 40. The O-ring 40 constitutes the main valve seal to engage against the ball 20, and a second O-ring 42 is carried in a recess 44 between concentric surfaces 46 and 48 on the seat ring 32 and the valve body 12 to seal around the seat ring 32. Finally, a third O-ring 50 is carried in a recess in the valve body 12 to complete fluid isolation of a chamber of groove 52 on the valve housing with which one or more fluid ducts 54, 55 in the valve body wall 12 communicate. Hence, a pressure fluid may be introduced into the ducts 54, 55 to assert a force against the O-ring 42, and through it, the seat ring assembly 32, 34 to effect a firm, positive sealing action with the ball 20. A series of coil springs 56 carried on the valve body 12 force the seat ring assembly 32, 34 against the ball 20 for initial sealing pressure. In addition, the springs 56 will insure a seal in the event hydraulic pressure should fail for any reason.

An annular groove 58 around the front face of the outer seat ring 34 slidably receives a rearward extending, annular piston 60 on an anchor member or ring 62, which is firmly secured to the valve body wall 12, as by bolting at 64. A small O-ring 65 seals around the duct 70 and larger O-rings 66 and 68 make the groove 58 a fluid-tight chamber with which the duct 70 in the anchor ring communicates. It will be apparent that a pressure fluid may be introduced into the duct 70 through a feed duct 72, 73 to pressurize the chamber 58 and force the seat ring assembly 32, 34 away from the annular piston 60 on the anchor member 62, and hence away from the ball 20 to the position shown in FIG. 3. In this position, the ball 20 is free to turn without rubbing or scraping against the seat rings 32, 34 or the resilient seal 20.

Thus, it will be seen that the anchor ring 62 is the nature of a stationary piston, while the groove or annular chamber 58 is a movable cylinder working in cooperation therewith.

THE EMBODIMENT OF FIG. 4

In the embodiment illustrated in FIG. 4, a groove 78 is formed in the anchor ring 80 which is bolted at 82 to the valve body wall 12a. Consequently, in this embodiment, the anchor ring 80 is in the nature of a stationary cylinder into which a pressure fluid may be introduced through ducts 83, 84 through the anchor ring 80 and valve body wall 12a. An annular piston or pusher ring 88 is slidably carried in the groove 78 and suitable sealing means, such as the resilient seal ring 90 may be provided to seal around the annular piston 88. The seal ring 90 is compressed between the cylindrical side walls of the groove 78 to form an O-ring type seal. It may be of any suitable configuration, such as the modified rectangular shape shown, or it may be circular. Preferably, a protector ring 92 is provided to protect the seal ring from damage by abrasion against the duct ports 84a, and a tight fitting ring 94 of Teflon or the like is provided to prevent extrusion of the seal ring 90 around the piston 88. A radial extension or skirt 96 on the outer seat ring 98 extends behind the anchor ring and is engaged by the piston or pusher ring 88. It is apparent, therefore, that introduction of a pressure fluid into ducts 83 and 84 will pressurize the annular chamber 78 to push the piston 88 and the seat ring assembly 98, 100 back to retract the seat ring assembly away from the ball 20.

THE EMBODIMENT OF FIG. 5

The embodiment of FIG. 5 is identical to that of FIGS. 2 and 3 except that, as in the embodiment of FIG. 4, the seat ring assembly 100, 34 is urged toward the spherical surface 21 of the ball by means of fluid pressure in the pipeline system, as well as by means of the springs 56. This is accomplished by forming the outer and inner concentric surfaces 48 and 46 between which the tail seat ring seal 42 seals on sealing diameters $D_1$ and $D_4$ which are, respectively, larger and smaller than the maximum and minimum main sealing diameters $D_2$ and $D_3$. Hence, on the upstream side with the greater pressure in the line, the O-ring 42 will be urged downstream so that it seals on the diameter $D_1$. At the same time, line pressure $P_1$ is transmitted through the main seal to seal approximately on diameter $D_2$. Therefore, in the annular area between diameters $D_1$ and $D_2$ upstream line pressure at the back is opposed in the front by the normally lower pressure $P_2$ in the body 12.

In the event body pressure exceeds line pressure, as in normally the case on the downstream side, the trailing O-ring 42 is pushed toward the rear by body pressure $P_2$ passing behind anchor ring 62, or through ducts 102, and behind the outer seat ring 34 to seal on diameter $D_4$. Since at the same time the main seal is on approximately diameter $D_3$, there is an annular area between diameters $D_3$ and $D_4$ wherein the higher body pressure $P_2$ at the back is opposed in the front by the lower line pressure. Again, therefore, the seat ring assembly is urged toward the ball 20.

While this invention has been described in conjunction with preferred embodiments thereof, it is obvious that modifications and changes therein may be made by those skilled in the art without departing from the spirit and scope of this invention.

We claim:

1 In a flow-blocking device adapted for connection to a fluid conduit and including a body member having a flow passageway adapted to communication with said conduit and a closure member having a working surface thereon movable transversely to the axis of said flow passageway into and out of alignment therewith, sealing means surrounding said flow passageway comprising:

a seal ring assembly movable in said body member into and out of sealing engagement with said working surface;
an anchor member fixed on said body member;
a pair of annular members coaxial with said seat ring assembly;
an annular fluid chamber having concentric cylindrical walls around one of said annular members;
the other of said annular members comprising an annular piston slidably received in said annular chamber;
one of said annular members being adapted to move said seal ring assembly;
said anchor member restraining the other of said annular members against axial movement so that when said chamber is pressurized, said seat ring assembly is retracted from said closure member;
duct means for introducing a pressure fluid into said chamber;
first and second pairs of cylindrical sliding surfaces on said seat ring and said body member;
said second pair of sliding surfaces being smaller in diameter and more remote from said closure member than said first pair to form an annular space around the trailing portion of said seat ring assembly;
seal means in said annular space sealing between said seat ring and said body member;
a main seal ring around the leading face of said seat ring assembly to seal against said closure member;
said first pair of sliding surfaces being at least as large as, and said second pair of sliding surfaces being at least as small as, respectively, the maximum and minimum effective sealing diameters of said main seal ring; and
a fluid bypass passageway extending radially by said pair of annular members to expose the back of said seat ring assembly radially outward of said seal means to pressure outward of said annular members.

2. The combination defined by claim 1 wherein said duct means extends through said body member and said anchor member.

3. The combination defined by claim 1 including a seal ring in said chamber sealing between opposite concentric walls thereof.

4. The combination defined by claim 1 including a resilient seal ring in said annular chamber compressed between said concentric cylindrical walls to form a seal therewith.

5. The combination defined by claim 2 wherein:
the annular chamber is on said anchor member; and
said annular piston is disposed to push against said seat ring.

6. The combination defined by claim 2 wherein:
the annular chamber is on said seat ring;
the annular piston is fixed on said anchor member; and
the duct means extends through the annular piston.

7. The combination defined by claim 1 including:
an annular space around the trailing portion of said seat ring and said body member:
said seal means comprising axially spaced seal rings sealing against leakage in either direction from said annular space; and
second duct means for introducing pressure fluid into said annular space to urge said seat ring toward said closure member.

8. The combination defined by claim 1 wherein:
said annular members generally surround said seat ring.